May 5, 1931. C. H. CRAGO ET AL 1,803,462
CENTRIFUGAL TYPE DUST SEPARATOR
Filed March 23, 1928
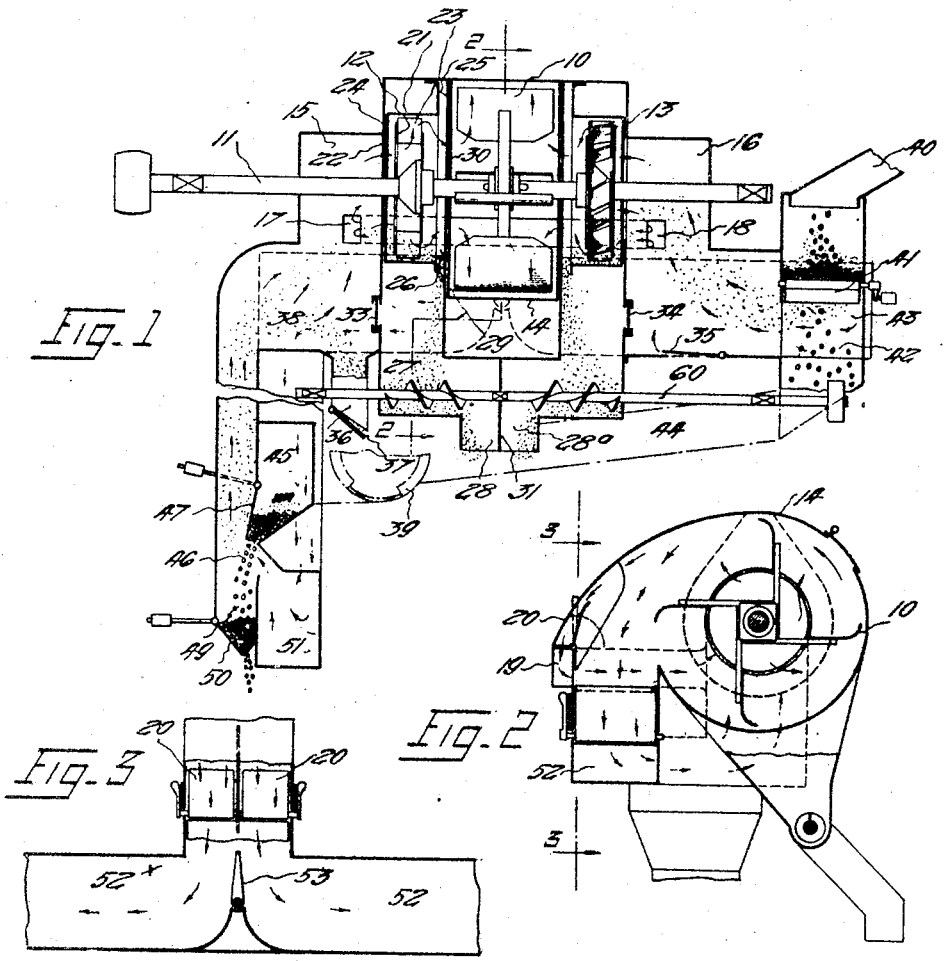
INVENTORS:
Claude Harold Crago
Albert Ernest Hamilton
BY Reay, Boyce & Bakelar
ATTORNEYS.

Patented May 5, 1931

1,803,462

UNITED STATES PATENT OFFICE

CLAUDE HAROLD CRAGO, OF STRATHFIELD, NEAR SIDNEY, AND ALBERT ERNEST HAMILTON, OF CARLINGTON, NEAR SIDNEY, NEW SOUTH WALES, AUSTRALIA

CENTRIFUGAL-TYPE DUST SEPARATOR

Application filed March 23, 1928, Serial No. 264,249, and in Australia June 30, 1927.

This invention relates to apparatus of the centrifugal type for extracting dust, soot, flour particles, and other suspended solid matter from air and gases. The apparatus is utilizable with great advantage in connection with grain cleaning plant, for clarifying air which has picked up dust in passing through streams or showers of grain which is undergoing cleaning treatment.

The apparatus consists essentially of a centrifugal fan arranged for maintaining a circulation of air through the apparatus, a shrouded vortex separator on the same shaft as the circulating fan, and a closed circuit system of air passages and dust collecting hoppers. The separator is housed in a drum casing which is slitted peripherally to allow dust which suffers extraction by centrifugal effect in the vortex to pass into a dust collecting hopper in which the separator housing is enclosed. One circulating fan may serve two separators, disposed respectively at either side of it.

The essential feature which characterizes the apparatus is the structure of the separators and their relation to the circulating fan. These separator fans produce a vortex circulation in their casings. Both ends of their casings are open centrally, the vents being circular and of equal area. The casings are contained in closed dust chambers in which the separated dust is collected and they are in communication with these dust chambers through peripheral slits. As the dust chambers are air tight there is no air or gas flow in a radial direction out of the separator casings, but projected solids pass out of them through the peripheral slots into the dust chambers. The course of the air or gas flow through the separators is in an axial direction and the separator fans are shrouded on both sides—by ring plates next the entering side of the casing and by disc cheeks next the leaving side of the casing. The draft is thus caused to enter the separator casings centrally and is forced to pass radially or tangentially between the blades so that solids carried in it are thus subjected to centrifugal action and are ejected into the dust chamber; and the draft thence passes over the disc shrouds inward to the vent on the leaving side of the casing.

It is already the practice to subject gases to vortex centrifuging to separate tar from them, and that method of treating gases is therefore not claimed at large.

In the accompanying drawings:—

Fig. 1 is a semi-diagrammatic vertical longitudinal section through a duplex type machine arranged for extracting dust from air coming from grain cleaning apparatus;

Fig. 2 is a transverse section on the plane 2—2 of Fig. 1;

Fig. 3 is a vertical longitudinal section on the plane 3—3 Fig. 2;

Fig. 4 is an enlarged sectional view explanatory of the structure and housing of one of the extractor fans, showing also part of the circulating fan casing; and Fig. 5 is a vertical longitudinal section through a machine having two extractor fans arranged in tandem relation with one circulating fan.

10 is the air circulating fan. It is keyed to the shaft 11 which is driven by any usual means. Upon this shaft also is carried two extractor fans 12—13, one at either side of the casing 14 in which the fan 10 operates. 15 and 16 are chambers on the intake sides of the extractor fan casings. These chambers 15 and 16 are in communication through ports 17 and 18 and air passageways 19 with the circulating fan casing 14, 20 being adjustable valves for controlling the admission of air from the casing 14 to the passageways 19, so that the delivery of air to the ports 17—18 can be proportioned to produce the best operating conditions within the apparatus. The air which passes into the passageways 19 is divided, one portion of it going to the port 17 and the other to the port 18. The control on this by-pass circulation by means of the valve 20 facilitates adjustment of the atmospheric depression in the chambers 15 and 16 so that a desirable regulation of the depression may be effected to best procure extraction of dust under any particular set of circumstances. The chamber 15 is in communication with the casing 21 in which the fan 12 operates, through a central orifice 22 in the end of the casing 21. This aperture 22 is circular, and in diameter it is nearly the full diameter of the casing 21. It is, however, necessary that it should not extend to the full diameter of the casing 21. The fan vanes 23 or the greater part of them must be shrouded by the ring portion of the casing 24 surrounding the aperture 22. The casing 21 does not extend quite up to the wall 25 of the circulating fan chamber 14. A peripheral slotway 26 is left between the casing 21 and the wall 25 for the discharge of dust from the vortex casing 21 into the dust chamber 27. This dust chamber is part of the closed circuit and is constructed with a hopper foot or a lock chamber 28 at the bottom of it in which the collected dust is accumulated and from which it is periodically removed. The side 25—29 of the centrifugal fan casing is centrally apertured at 30, the aperture being in alignment with and the same area as the aperture into the vortex casing 21 from the chamber 15 at the inlet side of it. 31 is a septum which divides the dust chamber 27 into two sections. The arrangement at the right hand side of it is the same as the arrangement at the left hand side of it, the separator fan 13 and its casing corresponding with the separator fan 12 and its casing, with the detail of the arrangement identical in each case. 33—34—35 are damper valves which are not essential but which may be fitted to procure maximum facility for regulation of draft controls. 36 is a dust hopper, and 37 a valve at the foot of it. This hopper is provided for collecting dust which may be dropped in the anterior chamber 38 through which the dust laden air comes to the intake chamber preceding the separator fan 12. 39 indicates grain cleaning apparatus, the particular type of which is immaterial to the invention. The grain which is being subjected to cleaning treatment passes into the apparatus through the chute 40 onto a showering tray or similar device 41. Thence it passes in a shower as indicated at 42 through a chamber 43. From the chamber 42 it passes by gravity through a chute chamber 44 to the grain cleaner 39 and from this cleaner it is delivered into the box hopper 45. From this hopper it passes out in a shower as shown at 46, a weighted valve 47 controlling the outflow so that there is always a considerable depth of grain in the hopper. The shower of clean grain 46 falls into the foot box 49 in which a considerable depth of it is carried by the loaded valve 50 so as to choke inflow of air from atmosphere. 51 is an air box which is connected to the air trunk 52 into which cleaned air is delivered by the circulating fan 10. The other side 52* of this air trunk goes to the chamber 43. The distribution of the outflow from the circulating fan 10 to the trunk 52—52* is regulated by the tongue valve 53 which may be thrown over either way to any desired angle. The air circulation which takes place is in a closed system entirely within the apparatus, that is to say, practically no air is brought into the apparatus and practically no air passes out of it. The dust condition arises only within the apparatus and the apparatus functions to extract the released dust and to re-utilize the cleaned air for the purpose of taking up repeatedly the dust which is liberated from the grain as it passes through the apparatus.

The course of the drafts is shown as far as practicable by means of arrows and the operation is as folows:—Grain passing in through the chute 40 is showered as shown at 42, and air coming to it through the air trunk 52* and thence into the chamber 43 takes the dust up in suspension and carries it up through the chamber 16 to the separator fan 13. The air is whirled by that fan and the solid particles are projected out of it by centrifugal action and find egress through the peripheral slit 26 and thence fall into the dust collector chamber 27. In that chamber the deposited dust is moved along by the creeper 60 into the hopper 28a, whence it may be removed at intervals. The air thus discharged of dust passes into the circulator fan casing, and by the circulator fan 10 is driven out again into the air trunks 19 and 52. Portion of the air which passes into the trunk 19, depending upon the adjustment of the valves 20, goes back to the chamber, into which it enters through the aperture 18. The air which goes into the trunk 52 is divided by the valve 53 and portion of it passes through the trunk 52* back to the chamber 43. The grain having suffered this initial dusting goes to the grain treating machine 39 whence it is delivered into the chamber 45. It is showered from this chamber and air passing upward from the air box 51 which is at the foot of the trunk 52 is circulated through it, taking up the released dust in suspension. This dust-charged air passing upwardly goes into the chamber 38 and some portion of the dust is there dropped and collected in the hopper 36. The remainder of it goes into the extractor fan 12 and there suffers vortex treatment, with the result that the dust is liberated and the cleaned air passes onto the circulating fan chamber 14. The extracted dust falls into dust collecting chamber 27 and is moved by the creeper 60 into the hopper 28 at the foot of it, whence it is removed periodically. The cleaned grain passes out of the hopper 59 as shown.

The arrangement therefore provides a means whereby cleaning of grain may be conducted without fouling the surrounding atmosphere. The whole of the released dust is contained within the apparatus and is separated from the air which carries it within the extractor and the same air is circulated repeatedly in the extractor, successively taking up the dust and having the dust separated from it.

The structural detail of the separator fan is clearly seen in Fig. 4. The ring shroud 64 covers the incomer side of the blade 65 of the separator fan and the disc shroud 66 covers the outgoing side of the blade assembly 65. The periphery of the disc 66 is slightly greater in diameter than the aperture or internal diameter 67 of the shroud ring 64. The peripheral dust slit 26 is narrow. It extends down directly into a dust hopper 80 when the structural arrangements permit, necessity for a creeper 60 being then absent. The aperture 30 in the side of the circulating fan casing is the same diameter as the aperture 22 in the incoming side of the casing in which the extractor fan works.

The machine shown in Fig. 5 embodies features of construction substantially identical with those already described, but in this case it is adapted for the cleaning of air in mills or for the cleaning of air or gases brought from other apparatus so that the cleaned air or gas may be delivered direct into atmosphere again. This machine consists of one, but preferably two, separator fans arranged in tandem with a circulating fan. The circulating fan maintains a draft through the apparatus, bringing the dust laden air or gas through the separator fans and finally ejecting it in clean condition into the atmosphere. The incoming dust laden air is brought through a flue or trunk into the casing 70. Thence it passes through the open side of the vortex separator fan 71. The dust extracted is ejected through the peripheral slot 72 into the dust chamber 73; this chamber is closed so that no air circulation takes place through it. The cross sectional area of the peripheral slot 72 is regulatable by means of a slide sleeve 74 or a slide sleeve 75. The outgoing air passing in the direction shown by the arrows suffers similar retreatment by the second extractor fan 76, and the air thus retreated passes out through the air trunk 77 into the casing in which the circulating fan 78 operates; this fan discharges the cleaned air through its delivery orifice 79 to atmosphere or into a trunk through which it may be carried to apparatus in which it is required to be utilized. All three fans are keyed to and driven by the one shaft 80; the peripheral orifice in the casing 81 of the retreatment fan 76 is regulatable by means of the slide valve 82. The regulator valves are fitted with control means by which they may be adjusted without opening the casings. The dust extracted by the retreatment by the fan 76 is deposited in the second dust chamber 84, whence it may be removed from time to time as it accumulates.

What we claim as our invention and desire to secure by Letters Patent is:—

1. In apparatus for separating dust from air, a cylindrical casing open centrally at both ends and having an annular peripheral slot at its inner end, a closed dust chamber enclosing said casing, a centrifugal separating fan with helical vanes operating within said casing at the end distant from said annular peripheral slot, a shroud ring on the outer side of said fan shrouding said vanes, a shroud disc on the inner side of said fan, said disc being slightly greater in diameter than the internal diameter of said shroud ring, a circulating centrifugal fan arranged to draw air through said casing in an axial direction, said air passing between the vanes of the fan and over the periphery of said shroud disc, the dust moving forward with said air being trapped by the inner end of said casing and falling by gravity out through said peripheral slot into said dust chamber.

2. In apparatus for separating dust from air, a pair of cylindrical casings, each open centrally at both ends and having an annular peripheral slot at its inner end, a closed dust chamber enclosing said casings, a centrifugal separating fan with helical vanes operating within each of said casings at the end distant from said peripheral slot, both of said fans being mounted on one shaft, a shroud ring on the outer side of said fan shrouding said vanes, a shroud disc on the inner side of said fan, said disc being slightly greater in diameter than the internal diameter of said shroud ring, a circulating fan mounted on said shaft arranged to draw air through said casings in an axial direction, said air passing between the vanes of said separating fans and over the periphery of said shroud discs, the dust moving along with said air being trapped by the inner ends of said casings and falling by gravity out through said peripheral slots into said dust chamber.

3. Grain cleaning apparatus comprising a pair of cylindrical casings each open centrally at both ends and having an annular peripheral slot at its inner end, a closed dust chamber enclosing said casings, a centrifugal separating fan with helical vanes operating in each of said casings at the end distant from said peripheral slot, both of said fans being mounted on one shaft, a shroud ring on the outer side of said fan shrouding said vanes, a shroud disc on the inner side of said fan, said shroud disc being slightly greater in diameter than the internal diameter of said shroud ring, a circulating centrifugal fan located between said separating fans and arranged to draw air through said casings in an axial direction, said air passing between the vanes of the separating fans and over the periphery of said shroud discs, the dust moving along with said air being trapped by the inner ends of said casings and falling by gravity out through said peripheral slots into said dust chamber, and a closed circuit system of passages connecting the intake and exhaust sides of said circulating fan.

4. In grain cleaning apparatus as claimed in claim 3, by-passes in the closed circuit for short circuiting portion of the air from the exhaust side of the circulating fan to the inlet side of the separating fans and a valve for regulating the flow of air through said by-passes.

In testimony whereof we affix our signatures.

CLAUDE HAROLD CRAGO.
ALBERT ERNEST HAMILTON.